United States Patent
Aoki et al.

[15] 3,650,615
[45] Mar. 21, 1972

[54] SONIC FOCUSING SYSTEM FOR PROJECTORS

[72] Inventors: Chihiro Aoki, Aichi District; Takashi Hirata, Nagoya, both of Japan

[73] Assignee: Elmo Company Limited, Mizuho-ku, Nagoya, Japan

[22] Filed: June 22, 1970

[21] Appl. No.: 48,337

[52] U.S. Cl. ............................353/101, 95/44 C, 340/1 R, 352/140
[51] Int. Cl. ..................G03b 3/00, G03b 21/14, G01s 9/66
[58] Field of Search ...................353/101; 352/140; 73/67.7, 73/69; 340/1; 95/44 C

[56] References Cited

UNITED STATES PATENTS 2,743,429 4/1956 Erdman et al. ........................340/16 C
3,140,612 7/1964 Houghton et al. ........................73/517
3,494,694 2/1970 Motita ...................................352/140

*Primary Examiner*—Leonard Forman
*Assistant Examiner*—Steven L. Stephan
*Attorney*—Wenderoth, Lind & Ponack

[57] ABSTRACT

A sonic focusing system utilizes a beam of ultrasonic energy to detect an offset or displacement of a picture carrier to be projected from its initial focused position and is based upon the principle that upon the occurrence of such displacement, a phase difference is created between the ultrasonic waves after and before the occurrence of the displacement and therefore if this phase difference can be converted to a detecting signal for causing a focus control motor to be rotated in a direction causing the displacement of the picture carrier to be compensated, it becomes possible to bring the projection lens in focus automatically.

1 Claims, 7 Drawing Figures

Patented March 21, 1972 3,650,615

CHIHIRO AOKI and
TAKASHI HIRATA,
INVENTORS

BY Wendroth, Lind & Ponack
ATTORNEYS

CHIHIRO AOKI and
TAKASHI HIRATA,
INVENTORS

CHIHIRO AOKI and
TAKASHI HIRATA,
INVENTORs

BY Wenderoth, Lind & Ponack
ATTORNEYs

SONIC FOCUSING SYSTEM FOR PROJECTORS

This invention relates broadly to a projector such as a motion picture film projector and a slide projector, and more particularly to a sonic system for automatically focusing a projection lens assembly housed in the above type projector, which system utilizes the phenomena that a beam of sonic waves is propagated straight until it strikes a picture carrier such as a film or slide and then is reflected therefrom at the angle of reflection equal to the angle of incidence.

In projecting an image or images on the motion picture film or on the slide by the projector over a considerable period, such a film or slide tends to be affected by, for instance, heat originating from a source of projection light housed in the projector and consequently to be displaced slightly from its original position in a direction toward or away from the projection lens. Also, where the slide to be projected is interchanged with a next one, the image on the new slide will be placed in a position slightly axially different from that on the previous slide because of the presence of differences thickness of slide mounts and therefore the slide projector will be brought out of focus.

In order to compensate such displacement of the picture carrier, it has been heretofore practiced to adjust the projection lens manually so that it is brought in focus each time such displacement occurs. However, this first method of the compensation is disadvantageous in that, for instance, additional time and labor are required to adjust the focus of the projection lens.

For the purpose of eliminating these disadvantages of the first method, it has also been proposed to equip the projector with an optical focusing system of the type utilizing a ray of light such as infrared rays. However, as will be readily understood, this optical focusing system must include a source of light for the focusing system itself as well as the source of light for the projection, so that the focusing system is apt to cause an undesirable effect on the latter light source which is essentially contained in the projector to project the image or images onto a suitable projection screen, resulting in the disadvantages of unreliable operation less practicality, and so on.

It is accordingly an object of the present invention to provide an improved and new sonic focusing system which is free from the disadvantages of the prior art, and has advantageous features not possessed by known focusing systems.

With the focusing system according to the present invention, in order to achieve the above object and further objects as will hereinafter more fully appear, waves of a high-frequency mechanical vibrational energy such as ultrasonic energy are utilized to detect any amount of the displacement of the picture carrier to be projected. The focusing system is not affected at all by the source of light for use in the projection, and consequently a stable and reliable adjustment of the focus of the projection lens can be accomplished automatically with a high degree of precision, in spite of simplicity of the focusing system.

Briefly, the sonic focusing system of the invention comprises a combined converter and transmitter unit converting a high-frequency electrical energy to sonic energy and transmitting a beam of the converted sonic energy toward the plane of a picture carrier where it is reflected, and a combined receiver and converter unit receiving the reflected sonic beam and converting it to an electrical received signal. The phase between the waves of said electrical high-frequency energy and said electrical received signal changes in angle depending on in which direction said picture carrier is displaced with respect to its initial position in which the picture or pictures on said picture carrier is projected onto a screen without any lack of sharpness, so that if said phase difference can be detected and converted to a detecting signal such as causing a focus control motor to be rotated in such a direction as rendering the displacement of the picture carrier to be compensated, it becomes possible to bring the projection lens in focus automatically. For the purpose, an improved phase detecting circuit means is employed which comprises a pair of complementary transistors detecting either positive or negative half-cycles of said receiving signal depending on whether said receiving signal and said high-frequency wave of electrical energy are in phase or out of phase.

The invention will become more readily apparent from the following detailed description taken in conjunction with the accompanying drawings in which.

Figure 1A:
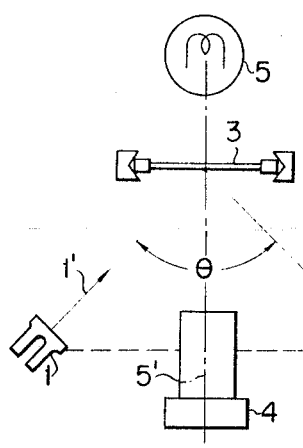
FIG. 1A is an arrangement plan of sonic transmitter and receiver units employed in the sonic focusing system of the present invention.

Referring now to the drawings and particularly to FIG. 1A, there is shown diagrammatically an arrangement comprising a combined converter and transmitter unit 1 converting a high-frequency wave of electrical energy to a beam of ultrasonic waves (the path of which is shown at 1') and transmitting it toward a picture carrier 3 such as a motion picture film or a slide which is disposed in a projection aperture (not shown) of the projector, and a combined receiver and converter unit 2 receiving the ultrasonic beam reflected from the plane of the picture carrier 3 on which a projection lens 4 is to be focused and converting it to an electrical received signal, the path of the reflected ultrasonic beam being shown at 2'. In this example, the picture carrier 3 is illustrated as being a slide. Preferably, the transmitter unit 1 and the receiver unit 2 are spaced at an angle $\theta$ apart and are so arranged as to be symmetric with respect to an optical axis 5', along which a beam of light from a projection lamp 5 travels through the slide 3 to be projected and the projection lens 4 to an ordinary projecting screen (not shown) to project an image or images on the slide 3 onto the screen. Thus, the receiver unit 2 can receive the reflected ultrasonic beam.

It will be understood that the value of the angle $\theta$ between the paths 1' and 2' of the incident and reflected ultrasonic beam can be changed between about 0° and 180°, and that the larger the angle $\theta$, the worse the detection sensitivity for the reflected ultrasonic beam. This means that it is possible to control the detection sensitivity by changing the angle $\theta$ to any desired value within the range described above. We, however, describe the invention in conjunction with the case $\theta = 90°$ for convenience of the description.

Figure 1B:
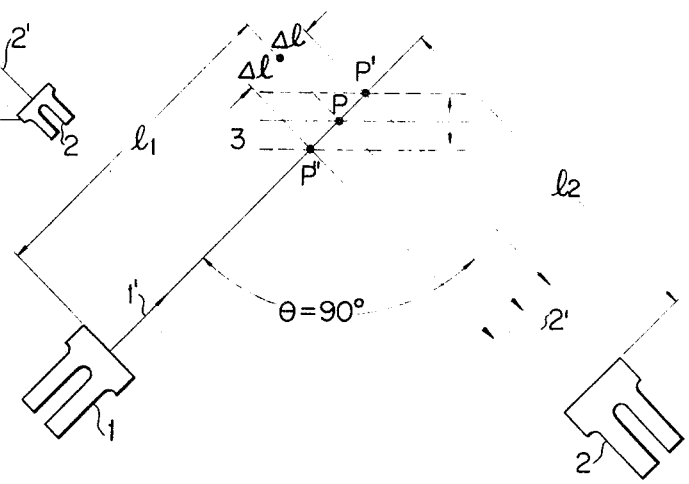
FIG. 1B, 2A and 2B are diagrammatic views useful in explaining the principles of the invention.
Figure 2A:
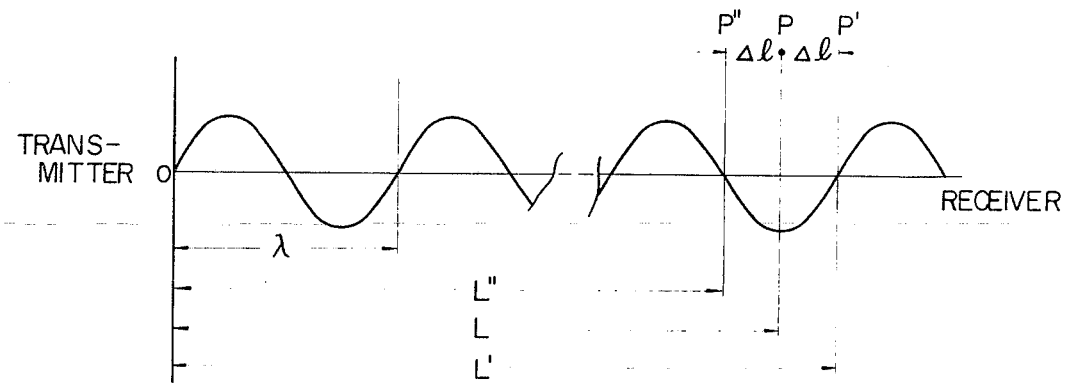

In FIG. 1B, there is illustrated diagrammatically a geometrical relationship between variations in the distance of the slide 3 from the projection lens 4 and in the length of the path through which the ultrasonic beam originating from the transmitter unit 1 travels to the receiver unit 2, and in this case, the angle $\theta$ is of course 90°. Assuming that the lens 4 is first focused on a position P in which the slide 3 is loaded initially, at this time, the total length $L$ of the paths 1' and 2' of the incident and reflected ultrasonic waves can be expressed by $$L = l_1 + l_2$$

wherein $l_1$ represents the distance from the transmitter unit 1 to the point P of incidence, and $l_2$ the distance from the point P to the receiver unit 2. As will be observed from FIG. 1B, when the slide 3 has been displaced for any reason to a position $p'$ or $p''$ by an amount $\Delta l$, there is a corresponding change in length of the path of the ultrasonic beam as follows $$L' = (l_1 + \Delta l) + l_2$$
$$L'' = (l_1 - \Delta l) + l_2$$

from which it can be readily understood that total length $L$ of the paths of the incident and reflected ultrasonic beams varies with variations in the distance of the slide 3 from the projection lens 4. Therefore, it will be appreciated from FIG. 2A that such variations in the total length $L$ of the paths cause the occurrence of a phase lag or advance between waves of a receiving signal of the receiver unit 2 and a transmitting signal of the transmitter unit 1.

The sonic beam used herein in practice is preferably within the ultrasonic range of 30 to 100 Kc., but it is basically possible to use a beam outside the said range. The wave length of the sonic beam may be chosen in accordance with the required degree of focus control precision of the system. The wave length has a value $\lambda$ two times as large as the amount $\Delta l$ of the path difference to be measured or detected. It is of course the case that the degree of focus control precision of the system depends on the wave length.

Figure 2B:
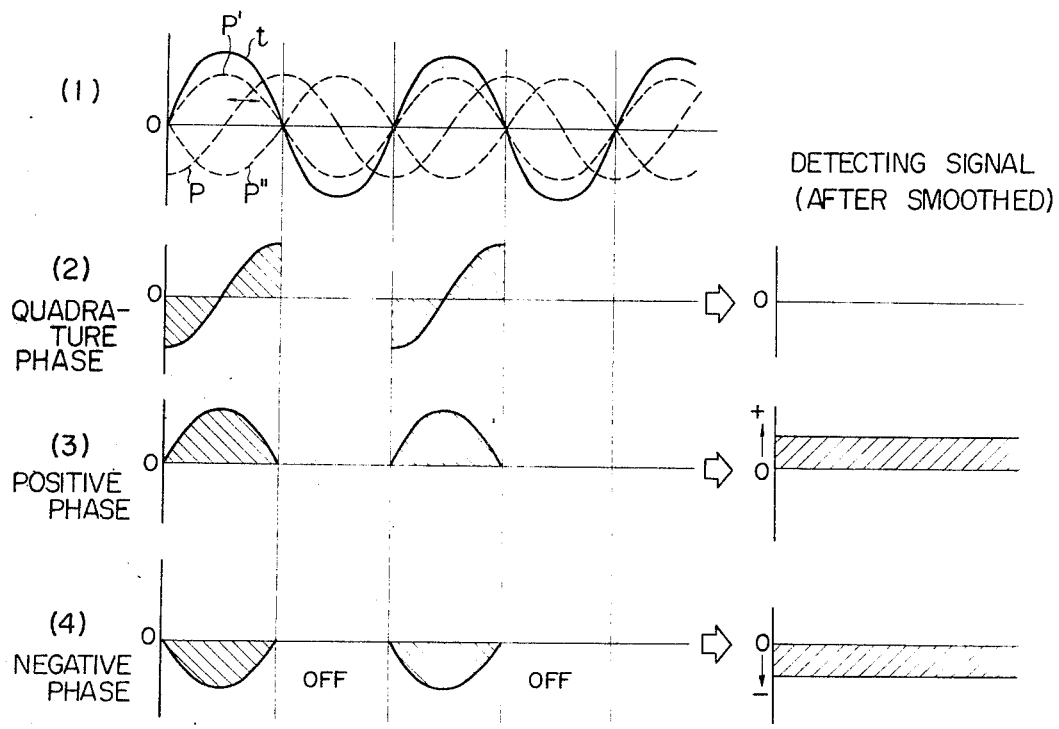

Under such conditions, the phase relations between the waves of the transmitting and receiving signals, when the slide 3 occupies the different positions P, P' or P'', are as shown in FIG. 2B-1, in which time is displayed along the abscissa. In FIG. 2B-1 are shown the separate waveforms $t$, $p$, $p'$ and $p''$. The waveform $t$ shown in solid line is for the transmitting signal of the transmitter unit 1, and the waveforms $p$, $p'$, $p''$ shown in dotted lines are, respectively, for the received signals of the receiver unit 2 as the slide 3 occupies the corresponding one of the positions $p$, $p'$, $p''$.

It will therefore be appreciated that, if such transmitting and receiving signals are sent to a phase detecting circuit means as will be described hereinafter, the latter can develop a detecting output signal such as a quadrature phase signal as shown in FIG. 2B-2, a positive phase signal as shown in FIG. 2B-3 and a negative phase signal as shown in FIG. 2B-4, in response to the change of the position of the slide 3. Thus, depending on whether the detecting signal is positive or negative, we can see in which direction the slide 3 is displaced with respect to the initial slide position P. So, it will be appreciated that, when a displacement of the slide 3 is built-up to a detectable extent, a required focus adjustment can be effected automatically by producing a detecting signal to be amplified and thereby causing a focus control means such as an electrical motor (which will be described hereinafter) to be rotated in a forward or backward direction to move the projection lamp 5, the transmitter unit 1 and the receiver unit 2 integrally or the slide 3 alone until the detecting signal, after being smoothed, becomes zero.

Figure 3A:
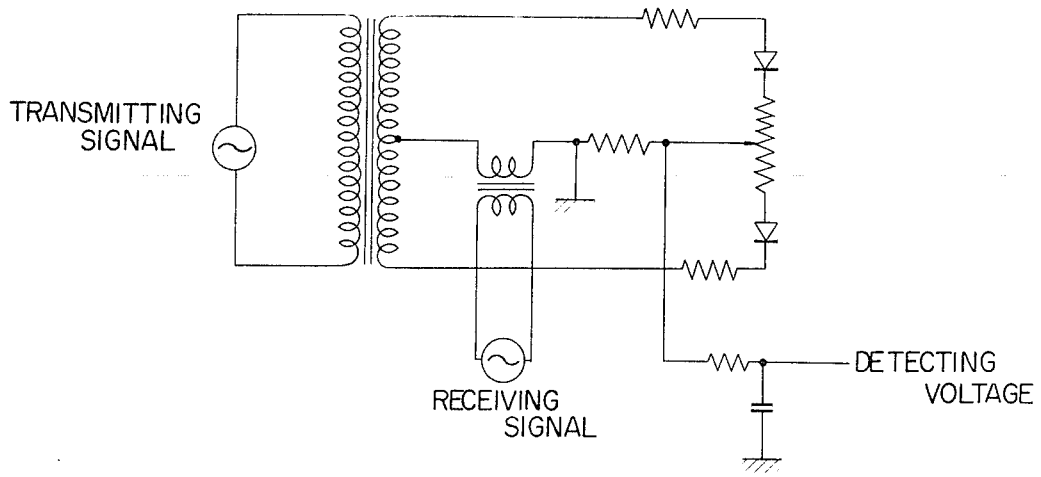
FIG. 3A is a wiring diagram of a conventional phase detecting circuit which is applicable to the invention but causes a comparatively large electrical loss.
Figure 3B:
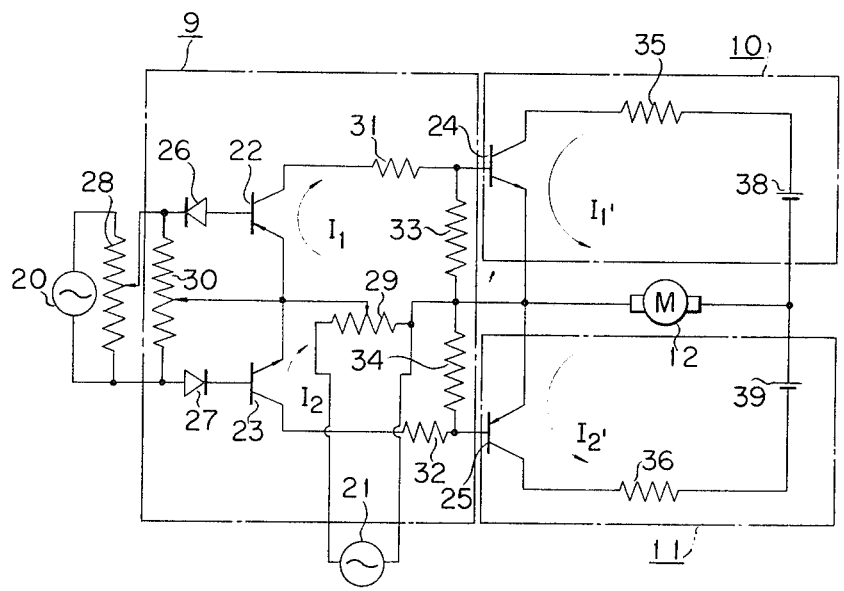
FIG. 3B is a wiring diagram of an improved phase detecting circuit preferably employed in the invention.

In FIG. 3A is shown a conventional phase detecting circuit which may be employed in the invention but which causes a comparatively large electrical loss, the operation thereof being not described as it is well known by those skilled in the art. In FIG. 3B are shown an improved phase detecting circuit means 9 and other components forming part of the present focusing system, which detecting circuit is preferably employed in the invention and the operation of which will be described hereinafter.

Figure 4:
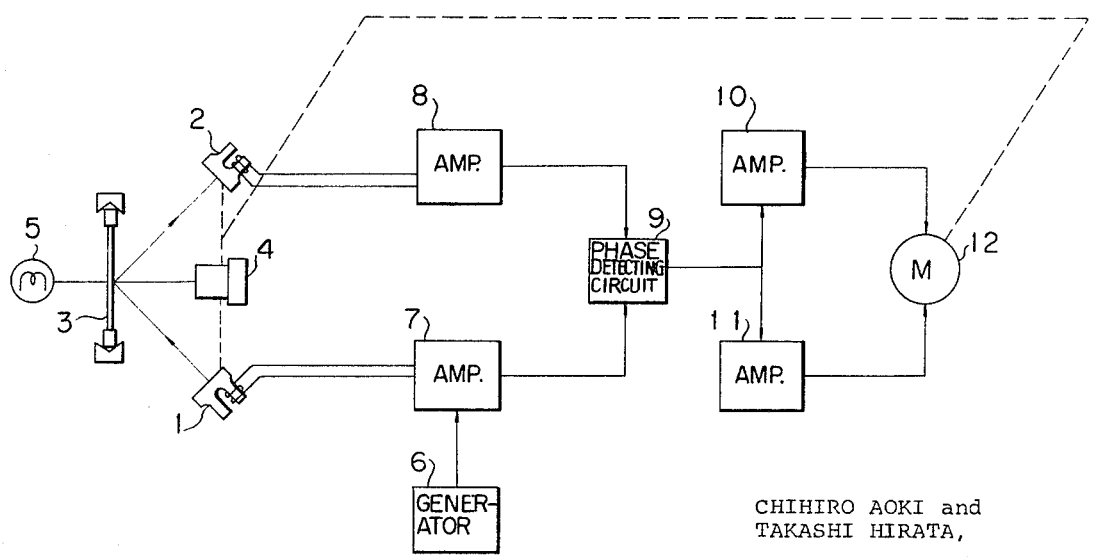
FIG. 4 is a block diagram of an embodiment of the sonic focusing system constructed in accordance with the principles of the invention.

Referring to FIG. 4, there is shown a block diagram of one embodiment of the sonic focusing system constructed in accordance with the invention, in which the numerals 1–5 designate like parts to the parts in the structures of FIGS. 1A and 1B, and the numeral 9 designates the improved phase detecting circuit. A high-frequency wave of electrical energy herein used is generated by a high-frequency generator 6 in a conventional manner and applied to a high-frequency amplifier 7 where it is amplified. A signal amplifier 8 is provided to amplify the received signal sent from the receiver unit 2. Numerals 10 and 11 designate, respectively, amplifiers for amplifying the detecting signal derived from the phase detecting circuit 9, the amplified signal causing a focus control motor 12 to be rotated in a forward or backward direction until the projection lens 4 is brought into focus, thus effecting a focus adjustment automatically.

In operation, the high-frequency wave of electrical energy, the frequency of which is preliminarily chosen at a suitable value depending on a control variable of the displacement of the slide 3, generated by the high-frequency generator 6, is first sent to the high-frequency amplifier 7 to be amplified thereby and then applied to the combined converter and transmitter unit 1 where the said high-frequency wave is converted to the high-frequency mechanical vibrational wave, i.e., an ultrasonic wave and which emits in turn the beam of the ultrasonic wave toward the intersection of the slide 3 and the optical axis 5'. The emitted sonic wave is then reflected back at the intersection and further travels toward the combined receiver and converter unit 2 at which it is, after being received, converted to an electrical received signal. Then, the received signal thusly converted is sent, after amplification by the amplifier 8, to the phase detecting circuit means 9 of the improved form where the received signal is compared with a reference signal, i.e., the transmitting signal picked up from the amplifier 7, the latter signal wave having of course the same phase as that of the high-frequency wave sent from the amplifier 7 to the transmitter 1. Depending on the phase difference between the received and transmitting signals, that is, depending on whether the detecting signal developed by the phase detecting circuit 9 is positive or negative, either the amplifier 10 or 11 is caused to operate in accordance with the aforementioned principle of the invention to cause the focus control motor 12 to be rotated in the forward or backward direction, whereupon the transmitter unit 1, the receiver unit 2 and the projection lens 4 are moved as a whole into a compensating position, with the result that the projection lens 4 is brought into focus.

As previously mentioned, it is preferable to employ the improved phase detecting circuit 9 as shown in FIG. 3B, instead of the conventional phase detecting circuit, because the latter detecting circuit causes a comparatively larger electrical loss and therefore a number of amplifying circuit means are inevitably required to amplify a detecting signal. The improved phase detecting circuit 9 will be described in conjunction with FIG. 3B as follows:

In FIG. 3B, numerals 20 and 21 designate the received and transmitting signals, 22 and 23 as well as 24 and 25 designate two pairs of complementary transistors each having substantially the same characteristic, 26 and 27 designate half-wave rectifiers using for instance semiconductor diodes, 28 and 29 designate variable resistors for adjusting the sensitivity of the circuit, 30 designates a variable resistor acting as a zero adjuster, that is, acting to equalize voltages applied to the rectifiers 26 and 27 to each other, 31, 32, 33, 34, 35 and 36 designate fixed resistors for the purpose of stabilizing the circuit, and 38 and 39 designate sources of power for driving the electric motor 12 in the forward and backward directions, respectively.

In operation, an alternating signal input provided in the form of the received signal 20 is first adjusted so as to have a suitable magnitude by the adjustment of the resistance of the variable resistor 28 and then, after rectification by the half-wave rectifiers 26 and 27, is applied across the bases of the complementary transistors 22 and 23. By adjusting the variable resistor 30, a voltage developed across the emitter and base of the transistor 22 is equalized to that developed across the emitter and base of the transistor 23, thus allowing the transistors 22 and 23 to have the same sensitivity. It will therefore be understood that the alternating received signal 20, after being rectified by the half-wave rectifiers 26 and 27, causes either the base-emitter circuits of the transistors 22 and 23 to be forward biased during positive half-cycles of the received signal 20 while causing the base-emitter circuits of the transistors 22 and 23 to be reverse biased during negative half-cycles of the received signal 20. Thus, the complementary transistors 22 and 23 operate as semiconductive switching elements. On the other hand, another alternating signal input having the same phase as that of the transmitting signal 21 from the high-frequency amplifier 7 is similarly adjusted to have a suitable magnitude by the adjustment of the resistance of the variable resistor 29 electrically connected between the junctions of the emitter terminals of the left-hand transistors 22 and 23 and the emitter terminals of the right-hand transistors 24 and 25, and this alternating signal input is adapted to be applied to the upper transistors 22 and 24 and the lower transistors 23 and 25 as positive and negative power sources when the respective base-emitter circuits of the transistors 22 and 23 are forward biased. The former pair of transistors 22 and 24 are turned ON during positive half-cycles of the transmitting signal while the latter pair of transistors 23 and 25 are turned ON during negative half-cycles of the transmitting signal.

In view of the foregoing description, it will be readily appreciated that, if the and transmitting signals were in phase, only the positive half-cycles of the transmitting signal will be applied to the transistors 22 and 24 and therefore a current or detecting signal current is allowed to flow through the transistors 22 and 24 as shown at $I_1$, but not through the transistors 23 and 25. In this case, the detecting signal having the waveform as shown in FIG. 2B-3 is applied to the base of the transistor 24 where it is amplified, so that a current $I_1'$ flows from the power source 38 in the form of a battery through the resistor 35 and the transistor 24 to the drive motor 12, thereby effecting a forward rotation of the drive motor 12 to compensate the offset of the picture carrier 3. In the case where the received and transmitting signals 180° out of phase, only the negative half-cycles of the transmitting signal will be applied to the transistors 23 and 25 and therefore, in contrast to the above case, a current or detecting signal current as shown in FIG. 2B-4 is allowed to flow through the transistors 23 and 25 as shown at $I_2$, but not through the transistors 22 and 24. The detecting signal is amplified by the transistor 25, and a current $I_2'$ flowing from the source 39 energizes the focus control motor 12 to rotate it reverse direction. Further, in the where the received and transmitting signals are 90° out of phase, where the picture carrier 3 is in its initial position P, both the currents $I_1'$ and $I_2'$ are allowed to flow alternatively as shown in FIG. 2B-2. Consequently, the control motor 12 is rotated in neither of the forward and backward directions. In either case, although the detecting signal derived from the phase detecting circuit 9 is still pulsated as shown in FIGS. 2B-2, 3 and 4 and the control motor 12 can be caused to be rotated by this pulsating detecting signal, the detecting signal can easily be smoothed out, if desired, by appropriate capacitors. The different detecting signals after being smoothed are shown in the right of FIG. 2B.

In the phase detecting circuit 9, although the various resistors 31, 32, 33, 34, 35 and 36 have been employed, the resistors may be basically omitted without departing from the principle of the invention. Furthermore, it is to be understood that the received signal may be applied at the position of the transmitting signal and vice-versa.

Thus, it is to be understood that, since this improved phase detecting circuit 9 is capable of comparing the received signal with the transmitting signal with a high degree of sensitivity, the ultrasonic focusing system of the present invention can accomplish automatically a stable and reliable focusing operation with a high degree of precision.

While the invention has been described and illustrated in conjunction with the preferred embodiment thereof, it is to be understood that various changes and modifications may be resorted to without departing from the spirit and scope of the invention.

What we claim is:

1. A sonic focusing system for a projecting machine of the type including at least a projection lens, a source of projection light and a projection aperture where a picture carrier is positioned to enable a picture thereon illuminated by said projection light to be projected clearly onto a screen by said projection lens while said picture carrier remains stationary in said projection aperture, said sonic focusing system comprising a combined converter and transmitter unit converting a high-frequency wave of electrical energy to a sonic wave and transmitting it toward said picture carrier positioned in said projection aperture said sonic wave being reflected at the plane of said picture carrier;

a combined receiver and converter unit receiving the reflected sonic wave and converting it to a wave of electrical received signal, the phase of said reflected sonic wave varying with an amount of offset of said picture carrier from an initial position in which said picture carrier is spaced a predetermined distance apart from said projection lens so that a clear image can be produced on said screen;

a phase detecting circuit means comprising a pair of complementary transistors detecting either positive or negative half-cycles of said received signal depending on whether said received signal and said high-frequency wave of electrical energy are in phase or out of phase;

two electrical power sources one positive and one negative, connected, respectively, across the emitter and collector of each of said transistors; and means for adjusting the distance between said picture carrier and said projection lens to compensate said offset of said picture carrier, said means being electrically connected between a junction of said transistors and a junction of said positive and negative power sources to be driven by either said positive or negative power source depending on which one of said transistors is in operation.

* * * * *